United States Patent [19]

Saxarra et al.

[11] 4,316,136
[45] Feb. 16, 1982

[54] SWITCHING REGULATOR CONTROL

[75] Inventors: Jürgen Saxarra, Backnang; Erich Pivit, Allmersbach, both of Fed. Rep. of Germany

[73] Assignee: Licentia Patent-Verwaltungs-G.m.b.H., Frankfurt am Main, Fed. Rep. of Germany

[21] Appl. No.: 150,660

[22] Filed: May 16, 1980

[30] Foreign Application Priority Data

May 18, 1979 [DE] Fed. Rep. of Germany ....... 2920165

[51] Int. Cl.$^3$ ............................................. G05F 1/56
[52] U.S. Cl. ................................................ 323/282
[58] Field of Search ............... 323/222, 282, 286, 290; 331/112, 146; 363/124

[56] References Cited

U.S. PATENT DOCUMENTS

| 3,368,139 | 2/1968 | Wuerflein | 323/286 |
| 3,461,377 | 8/1969 | Reese | 323/286 |
| 4,034,281 | 7/1977 | Morita et al. | 323/286 |
| 4,132,925 | 1/1979 | Schmutzer et al. | 323/286 X |

OTHER PUBLICATIONS

"Upgrade your Switches Analytically," *Electronic Design 10;* May 1978, pp. 108–113.
"On Dual Control Pulse Width Modulators For Stable Operation of Switched Mode Power Supplies," Wissenschaftliche Berichte, Aeg-Telefunken 52 (1979) 5, pp. 243–249.

*Primary Examiner*—William M. Shoop
*Attorney, Agent, or Firm*—Spencer & Kaye

[57] ABSTRACT

In a method for controlling a switching regulator composed of a controllable electronic switch and a transformer, in which the electronic switch forms a series path with the transformer primary, the series path is connected in series between a direct voltage source and a load, and the amplitude of the current flowing through the switch constitutes a criterion for controlling the load voltage, which method includes periodically causing the switch to assume one switching state at regular intervals occurring with a predetermined frequency, comparing the value of a comparison voltage corresponding to the load voltage and having a selected nominal value with a second voltage value, and causing the switch to assume its opposite switching state when a predetermined relation exists between the comparison voltage value and the second voltage value, the second voltage value is defined by the sum of the values of a constant reference voltage, a control voltage which varies as a function of the current induced in the transformer secondary by current through the switch subsequent to closing of the switch and while the switch remains closed and a voltage having a sawtooth waveform and varying between an initial value at the start of each regular interval and a final value at the end of each regular interval, the latter voltages being selected so that the sum of the constant voltage value, the value which the control voltage would have at the end of an interval if the switch were closed during the entire interval, and the final value of the sawtooth voltage is greater than the sum of the nominal value of the comparison voltage and the maximum permissible value of a jump in the comparison voltage corresponding to a maximum acceptable interfering voltage jump in the load voltage, and the sum of the constant voltage value, the value of the control voltage at the start of an interval and the initial value of the sawtooth voltage is less than the difference between the nominal value and the maximum permissible jump value of the comparison voltage.

3 Claims, 7 Drawing Figures $$T1: U_0 = L1 \frac{\Delta I}{T1}$$
$$T-T1: U1 = L1 \frac{\Delta I}{T-T1}$$
$$\frac{U_0}{T1} = \frac{U1}{T-T1}$$

SWITCHING REGULATOR CONTROL

BACKGROUND OF THE INVENTION

The present invention relates to a control of a switching regulator of the type which is connected to a direct current source and includes a series connection of a controllable electronic switch and a load, a criterion for controlling the load voltage being derived from the current flowing through the electronic switch. The invention also relates to a circuit arrangement for practicing this method and based on the circuit disclosed in FRG Offenlegungsschrift [Laid-open Application] No. 2,715,571.

The operation of pulse width regulated converter circuits, such as flux converters, blocking converters, up converters, etc., which operate with a constant switching frequency, is described in detail in the above-mentioned Offenlegungsschrift which discloses a control method that enables the known tendency of such converters toward resonance to be greatly reduced or even eliminated completely.

A drawback of that control method, however, is that the conductive period of the switch must not exceed one-half of the switching frequency period so as to avoid oscillations.

SUMMARY OF THE INVENTION

It is therefore an object of the present invention to enable the conductive period of such a switch to exceed one-half of the switching frequency period, and to even attain a conductive period duration almost equal to the entire switching frequency period duration while assuring that undesirable oscillations are either entirely supressed or decay again, i.e. are attenuated.

Objects according to the invention are achieved, in a method for controlling a switching regulator composed of a controllable electronic switch and a transformer, in which the electronic switch forms a series path with the transformer primary, the series path is connected in series between a direct voltage source and a load, and the amplitude of the current flowing through the switch constitutes a criterion for controlling the load voltage, which method includes periodically causing the switch to assume one switching state at regular intervals occurring with a predetermined frequency, comparing the value of a comparison voltage corresponding to the load voltage and having a selected nominal value with a second voltage value, and causing the switch to assume its opposite switching state when a predetermined relation exists between the comparison voltage value and the second voltage value, by performing the steps of: providing a constant reference voltage; providing a control voltage which varies as a linear function of the current induced in the transformer secondary by current through the switch subsequent to closing of the switch and while the switch remains closed; providing a time-varying voltage having a sawtooth waveform and varying between an initial value at the start of each regular interval and a final value at the end of each regular interval; and giving the constant voltage, the control voltage and the time-varying voltage values such that the sum of the constant voltage value, the value which the control voltage would have at the end of an interval if the switch were closed during the entire interval, and the final value of the time-varying voltage is greater than the sum of the nominal value of the comparison voltage and the maximum permissible value of a jump in the comparison voltage corresponding to a maximum acceptable interfering voltage jump in the load voltage, and the sum of the constant voltage value, the value of the control voltage at the start of an interval and the initial value of the time-varying voltage is less than the difference between the nominal value and the maximum permissible jump value of the comparison voltage; with the second voltage value being defined by the sum of the constant reference voltage value, the control voltage value and the time-varying voltage value.

The advantages of the invention are that a conductive period for the switch of greater than one-half the period of the switching frequency is made possible without the converter losing its stable behavior. The converter according to the invention can thus experience much greater influences from interfering voltages without undesirable oscillations or resonant frequencies being superposed on the switching frequencies or in such a manner that the latter decay again, i.e. are attenuated.

DESCRIPTION OF THE PREFERRED EMBODIMENTS

Figure 1:
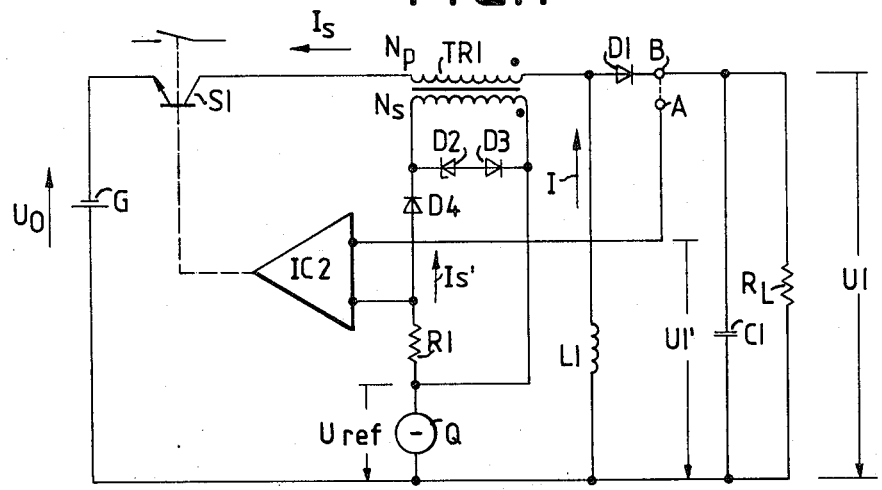
FIG. 1 is a circuit diagram of a blocking converter according to the prior art.

FIG. 1 shows a blocking converter circuit of the type disclosed in German Offenlegungsschrift [Laid-open Application] No. 2,715,571.

The illustrated circuit includes an electronic switch element S1, typically a transistor, and a transformer TR1 having its primary winding Np connected in series with the main current path of switch S1. Switch element S1, transformer primary Np and a diode D1 are connected in series between a direct voltage source G producing a voltage $U_0$ and a load $R_L$ bridged by a capacitor C1. In addition, an inductance L1 is connected across the series arrangement constituted by diode D1 and the parallel arrangement of load $R_L$ and capacitor C1. The voltage U1 across load $R_L$ is applied to one input of an operational amplifier IC2 operating as a comparator. The other input to amplifier IC2 receives a voltage constituted by the sum of a constant reference voltage $U_{ref}$ supplied by a direct voltage source Q and the voltage UR1 across a resistor R1 in series with source Q. The other terminal of source Q is connected to a point at the circuit reference, or ground, potential, as are the other sides of direct voltage source G, inductance L1, capacitor C1 and load $R_L$.

Resistor R1 is further connected, in series with a diode D4, across the secondary winding Ns of transformer Tr1. Also connected across secondary Ns is a series arrangement of a Zener diode D2 and a further diode D3.

Diodes D2, D3 and D4 are poled such that current induced in the secondary winding Ns when switch element S1 is closed flows in the forward direction of diode D4. Thus, the voltage produced across resistor R1 will be proportional to the current Is' induced in secondary Ns by the current Is flowing through the series arrangement of switch element S1 and transformer primary Np when switch element S1 is conducting.

In a known manner, switch element S1 is controlled to be turned on at the beginning of each switching cycle, causing an increasing current Is to flow through primary winding Np and inductance L1. This induces a correspondingly increasing current Is' in the transformer secondary Ns, resulting in a corresponding increase in the voltage UR1. When the sum of the voltages UR1 and $U_{ref}$ reaches a value equal to the voltage U1 across load $R_L$, amplifier IC2 produces an output signal which acts to open switch S1. The current which tends to continue flowing through inductance L1 is then conducted through the parallel arrangement of capacitor C1 and load $R_L$.

This circuit tends to self-excite, or produce oscillations, if the conductive phase of the switching transistor S1 is greater than one-half the period of a complete switching cycle T. This can be noted if the conductive path A-B is severed, a voltage U1' which corresponds to the load voltage is applied at point A in order to maintain the stationary state, and the current increase occurring at point B due to a voltage jump of magnitude $\Delta U1'$ at point A is considered. This is plotted in FIGS. 2 as a function of time, t.

Figure 2A:
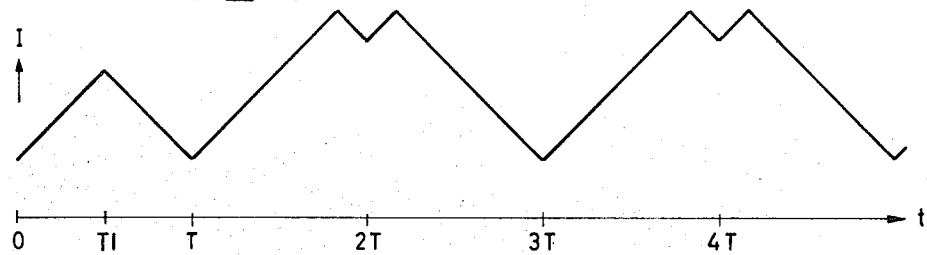
FIGS. 2a and 2b are signal diagrams illustrating the operation of the circuit of FIG. 1.

FIG. 2a shows the current I flowing through the inductance L1. It can be seen that in the time period from O to T there is no interference when the conductive period is T1=T/2 and beginning from time T there is interference with superposed resonant frequencies due to a jump $\Delta U1'$.

Figure 2B:
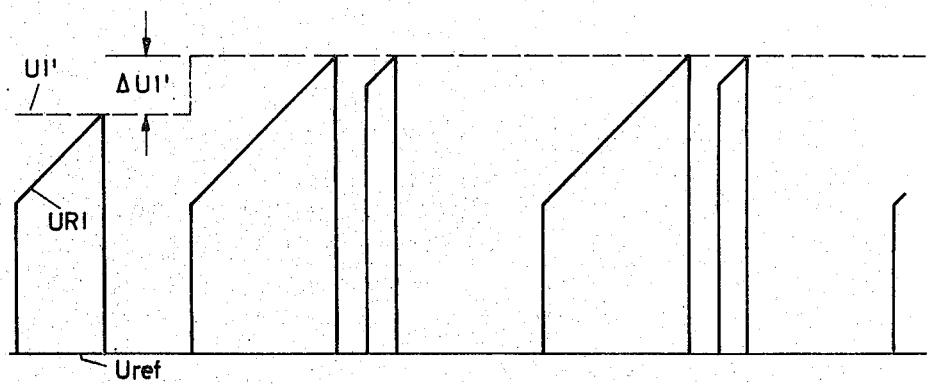

This voltage jump is illustrated in FIG. 2b, which also shows the waveform of the control voltage UR1 across resistor R1 of FIG. 1, which voltage is proportional to the switching current $I_s$ and is superposed on a constant reference voltage $U_{ref}$ provided by a source Q. When the sum of voltages UR1 and $U_{ref}$ becomes equal to the comparison voltage U1', the transistor switch S1 is blocked, i.e. the conductive period T1 is terminated.

Due to the subsequent jump $\Delta U1'$ in the voltage U1', the conductive period T1 is extended to a value of 5/6×T during every other switching period while in the intervening switching periods, the conductive period T1=1/6×T. This oscillating behavior, which is not usable for operation, occurs in the circuit according to FIG. 1.

Figure 3:
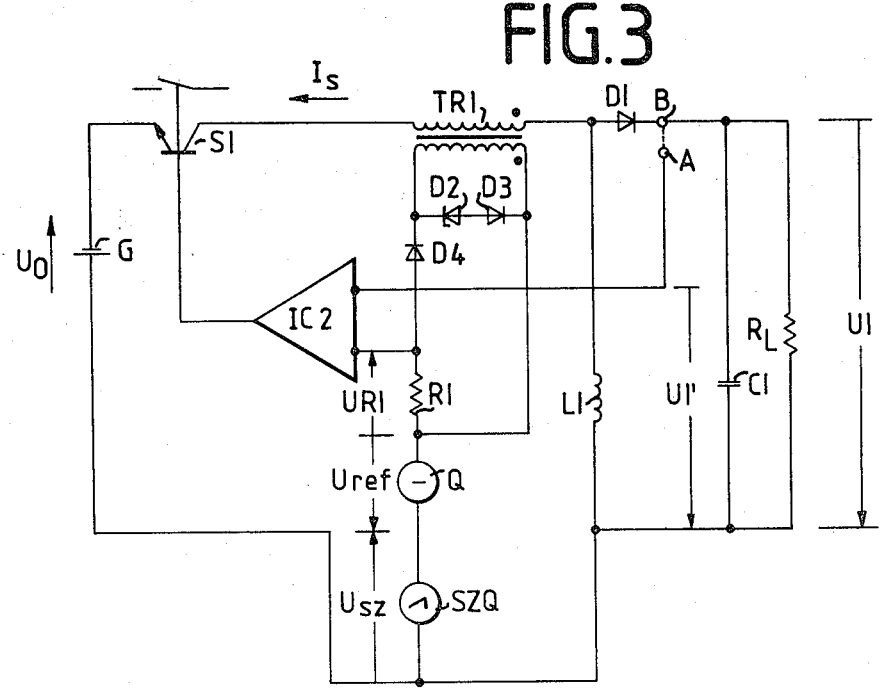
FIG. 3 is a circuit diagram showing the circuit of FIG. 1 modified according to a preferred embodiment of the invention. Only the vital parts of the invention are shown. The complete circuit is shown in FIG. 5.
Figure 4A:
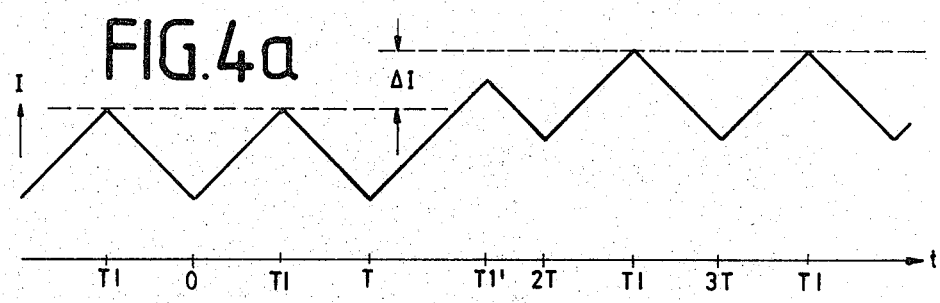
FIGS. 4a and 4b are signal diagrams similar to those of FIGS. 2a and 2b and illustrating the operation of the circuit of FIG. 3.
Figure 4B:
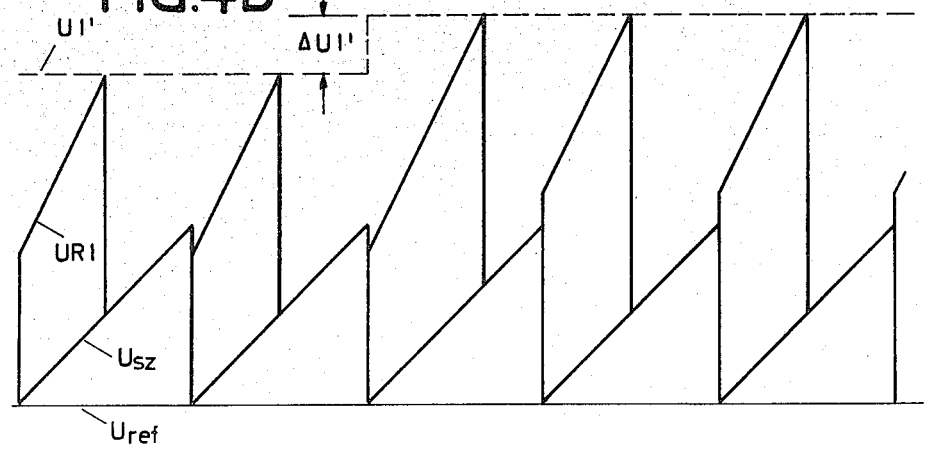

In contradistinction thereto, FIG. 3 shows the same blocking oscillator as FIG. 1, but additionally controlled, according to the present invention, by a sawtooth voltage generator SZQ which is inserted in series between the reference, or ground, potential point and the reference voltage source Q and which, as shown in FIG. 4b, furnishes a sawtooth signal Usz coinciding in frequency and phase with the switching cycle. FIG. 4a again shows the time waveform of the current I through the inductance L1 when there is a constant conductive period T1=T/2 in the stationary state up to time T of the interference voltage jump $\Delta U1'$. After the interference voltage jump there follows a switching period with a conductive period of T1'=⅓×T and beginning with the next following period the state is stationary again with a conductive period of T1=T/2. The blocking converter has thus returned to the stationary state within a single switching period, i.e. it exhibits a periodic damping with respect to interfering resonant frequencies.

FIG. 4b shows a plurality of voltage time waveforms: the constant direct voltage $U_{ref}$, the above-mentioned sawtooth voltage Usz and again the control voltage UR1 which is obtained from the switch conductive current and which is superposed on the two previously mentioned voltages. The comparison voltage U1' which experiences an interference voltage jump of $\Delta U1'$ at time T is again shown by a dashed line. Clearly distinguishable are the points in time T1 or T1', respectively, at which the sum of voltages UR1, Usz and Uref reaches the value of the comparison voltage U1' and thus the transistor switch is blocked for the remainder of the switching period.

Figure 5:
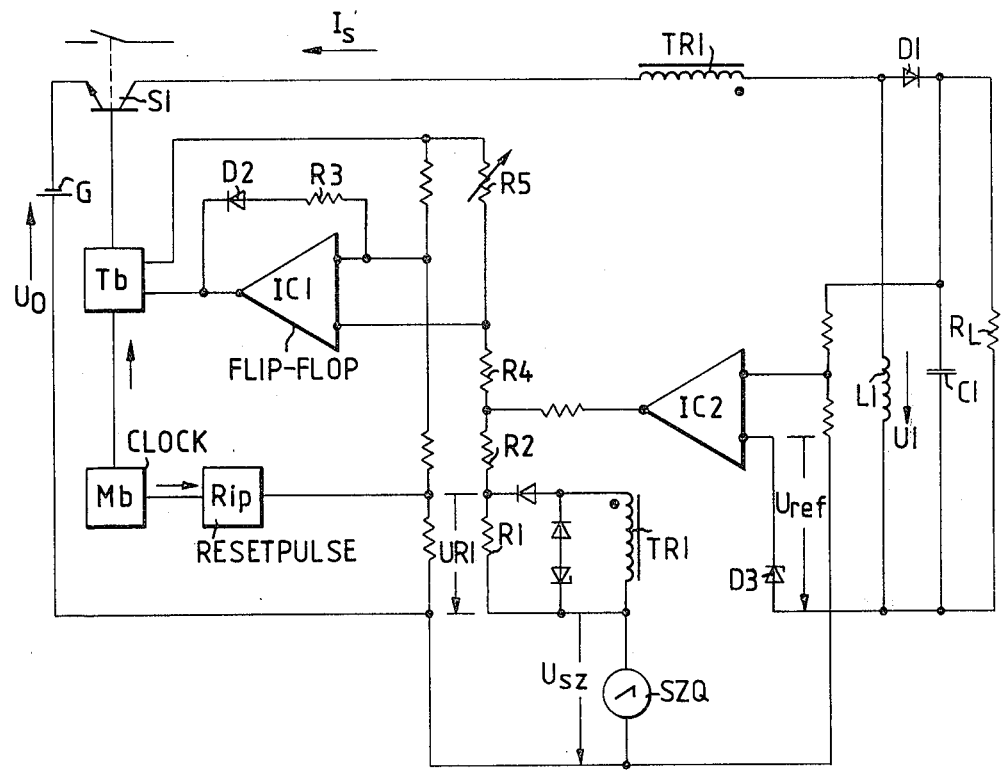
FIG. 5 is a circuit diagram of a blocking oscillator according to a preferred embodiment of the invention.

FIG. 5 shows an embodiment of the present invention based on a blocking oscillator arrangement as shown in FIG. 3 of the above-mentioned German Offenlegungsschrift. According to the present invention, the output branch of the operational amplifier IC2 includes the sawtooth voltage source SZQ connected in series between a point at the circuit reference potential and the components producing the control voltage UR1 which depends on the switch current. This sawtooth voltage source SZQ furnishes a sawtooth voltage of the height Usz (T). G is the input source with the voltage $U_O$. The output voltage at the load $R_L$ is U1. If switch S1 is closed, energy from G is stored in L1; if switch S1 opens the energy stored in L1 is transferred to the load circuit via diode D1. By variation of the switching ratio the output voltage can be controlled. The switching transistor S1 (for instance type 2N 6033) has a base drive circuit Tb. Tb is controlled by the clock multivibrator Mb and flip-flop IC1. The sawtooth voltage Usz is also derived from clock Mb.

At the beginning of a period T, S1 is closed via Tb by a starting impulse from Mb. The current in the storage inductor L1 starts to increase. A voltage proportional to this increasing storage inductor current is coupled to the flip-flop Ic1 by the transformer Tr1 (UR1). Superimposed on this voltage UR1 is the sawtooth voltage Usz. If the sum of UR1 and Usz exceeds a certain value at the flip-flop IC1, this flip-flop switches to the off-state and opens the switching transistor S1. Flip-flop IC1 held in the off-position by the positive feedback via D2 and R3. At the end of the period T, IC1 is reset by a reset pulse from the pulse former Rip.

The operational amplifier IC2 compares the output voltage U1 with the reference voltage of zener diode D3. The amplified error signal is added to the sum of UR1 and Usz and influences the switching time of the flip-flop.

The solution offered by the present invention is based on the unexpected discovery that, with a mixed actuation of pulse width controlled converters, i.e. with the method according to the invention, the advantages of a purely current control can be obtained with a current dependent as well as a sawtooth voltage dependent control and moreover, if certain dimensioning conditions are maintained, that the working range can be almost doubled with stable dynamic behavior. The advantages of this mixed control can be realized with all prior art pulse width controlled switching regulators.

In each of the illustrated embodiments, as well as in comparable embodiments based on other types of regulators, the desired control is achieved if the constant reference voltage, the control voltage and the sawtooth voltage are given values such that the sum of the constant voltage value, the value which the control voltage would have at the end of an interval if the switch were closed during the entire interval, and the final value of the sawtooth voltage is greater than the sum of the nominal value of the comparison voltage and the maximum permissible value of the jump in the comparison voltage corresponding to a maximum acceptable interfering voltage jump in the load voltage, and the sum of the constant voltage value, the value of the control voltage at the start of an interval and the initial value of the sawtooth voltage is less than the difference between the nominal value and the maximum permissible jump value of the comparison voltage.

The waveform of the sawtooth voltage may be either linear or nonlinear. A nonlinear sawtooth may have some advantages as described in: "Upgrade yours switches analytically," ELECTRONIC DESIGN 10; May 1978, pages 108–13.

An optimal value for the sawtooth voltage is achieved with the following equation:

$$U_{sz}(T) = U_D TR1\ Np/NsL1$$

where $U_D$ is the voltage across the inductor L1 driving the discharging cycle (T−T1) of the period T. The deviation of Usz from this optimal value may be from 0.1 to 10 times of this value.

In FIG. 3, FIG. 5, $U_D$ equals U1 (neglecting the forward voltage drop of D1)—but this is changed for other types of converters. Details of this dimensioning may be found in "On dual control pulse width modulators for stable operation of switched mode power supplies" Wissenschaftliche Berichte, AEG-TELEFUNKEN 52 (1979) 5, pages 243–249.

It will be understood that the above description of the present invention is susceptible to various modifications, changes and adaptations, and the same are intended to be comprehended within the meaning and range of equivalents of the appended claims.

What is claimed is:

1. In a method for controlling a switching regulator composed of a controllable electronic switch and a transformer, in which the electronic switch forms a series path with the transformer primary, the series path is connected in series between a direct voltage source and a load, and the amplitude of the current flowing through the switch constitutes a criterion for controlling the load voltage, which method includes periodically causing the switch to assume one switching state at regular intervals occurring with a predetermined frequency, comparing the value of a comparison voltage corresponding to the load voltage and having a selected nominal value with a second voltage value, and causing the switch to assume its opposite switching state when a predetermined relation exists between the comparison voltage value and the second voltage value, the improvement comprising: providing a constant reference voltage; providing a control voltage which varies as a function of the current induced in the transformer secondary by current through the switch subsequent to closing of the switch and while the switch remains closed; providing a time-varying voltage having a sawtooth waveform and varying between an initial value at the start of each regular interval and a final value at the end of each regular interval; and giving the constant voltage, the control voltage and the time-varying voltage values such that the sum of the constant voltage value, the value which the control voltage would have at the end of an interval if the switch were closed during the entire interval, and the final value of the time-varying voltage is greater than the sum of the nominal value of the comparison voltage and the maximum permissible value of a jump in the comparison voltage corresponding to a maximum acceptable interfering voltage jump in the load voltage, and the sum of the constant voltage value, the value of the control voltage at the start of an interval and the initial value of the time-varying voltage is less than the difference between the nominal value and the maximum permissible jump value of the comparison voltage; with the second voltage value being defined by the sum of the values of the constant reference voltage, the control voltage and the time-varying voltage.

2. In a switching regulator including a controllable electronic switch defining a current flow path, a direct voltage source, a transformer having primary and secondary windings, and an inductance, with the inductance, the transformer primary winding and the current flow path being connected together in series across the voltage source such that one side of the voltage source is connected to one side of the inductance at a point at the circuit reference potential, the regulator further including a first diode and a load connected together in series across the inductance such that the first diode is poled to conduct current supplied by the source in its forward direction, a capacitor connected across the load, an operational amplifier having a first input connected to receive a voltage corresponding to that across the load, a reference voltage source connected between the point at circuit reference potential and the second input of the operational amplifier, a rectifier forming a series arrangement with the transformer secondary winding, means connecting the series arrangement between one of the second input and output of the operational amplifier and the point at circuit reference potential, means connecting the output of the operational amplifier for controlling the electronic switch, a resistor connected across the series arrangement to provide a control voltage, and a Zener diode and a second diode connected together in series across the transformer secondary winding such that current from that winding flows in the forward direction of the Zener diode and in the reverse direction of the second diode, the improvement comprising a sawtooth voltage generator connected in series with said series arrangement for producing a sawtooth voltage in synchronism with the switching frequency of said regulator.

3. A circuit as defined in claim 2 wherein said switch is caused to assume one switching state at regular intervals occurring with a predetermined frequency and its other switching state when a predetermined relation exists between the value of the voltage applied to the first input of said operational amplifier and the sum of the value of the voltage provided by said reference voltage source, the value of the control voltage and the value of the sawtooth voltage, and said predetermined relation is such that the sum of the reference voltage value, the value which the control voltage would have at the end of an interval if the switch were closed during the entire interval, and the value of the sawtooth voltage at the end of an interval is greater than the sum of the nominal value of the comparison voltage and the maximum permissible value of a jump in the comparison voltage corresponding to a maximum acceptable interfering voltage jump in the load voltage, and the sum of the reference voltage value, the value of the control voltage at the start of an interval and the value of the sawtooth voltage at the beginning of an interval is less than the difference between the nominal value and the maximum permissible jump value of the comparison voltage.

* * * * *